Nov. 17, 1931.  W. L. MARDEN  1,831,965
CUT-OFF MECHANISM FOR METERS
Filed June 14, 1929
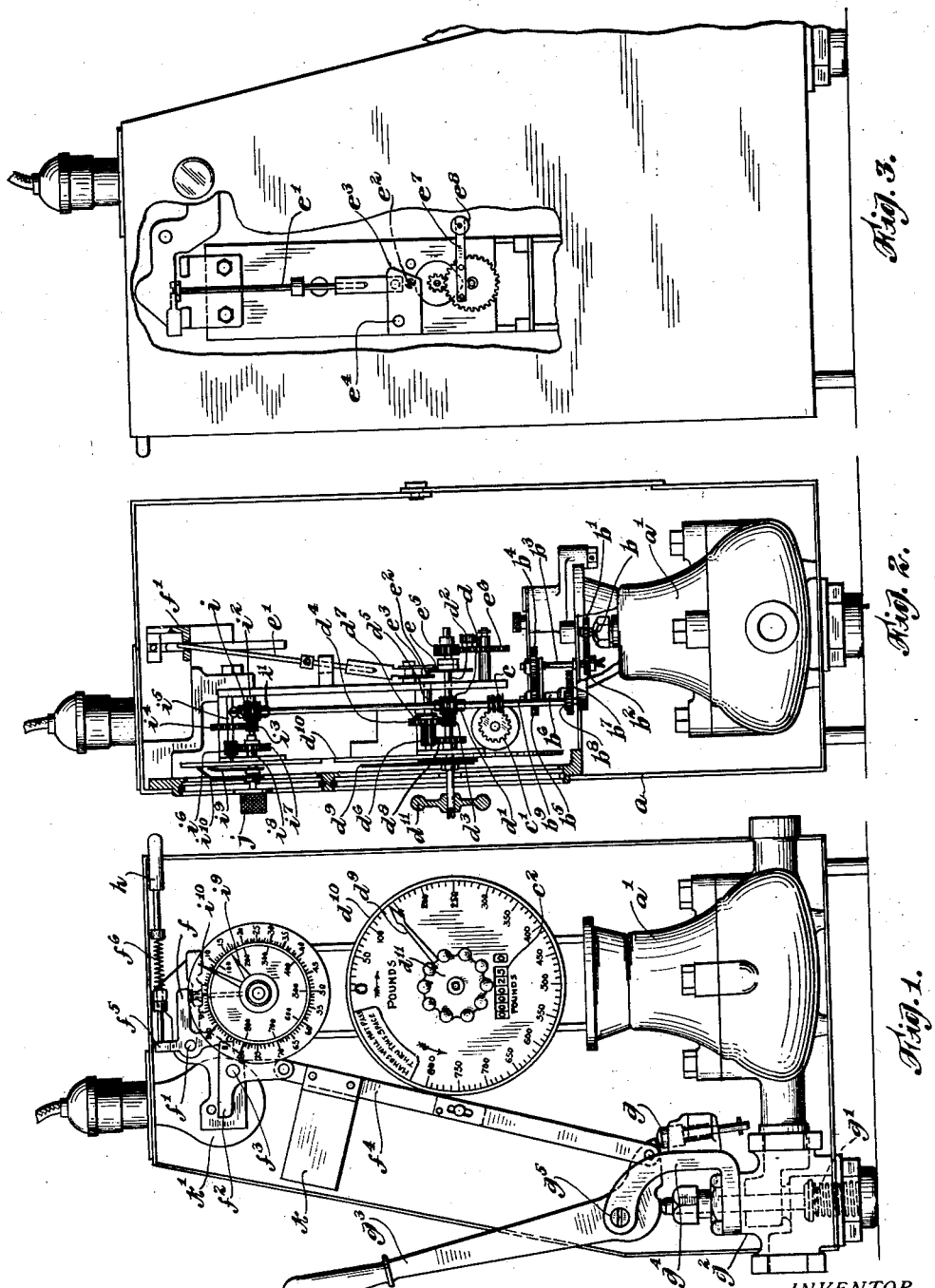
INVENTOR
William L. Marden
BY
Redding, Greeley, O'Shea & Campbell
ATTORNEYS Patented Nov. 17, 1931

1,831,965

UNITED STATES PATENT OFFICE

WILLIAM L. MARDEN, OF ELMHURST, NEW YORK, ASSIGNOR TO NEPTUNE METER COMPANY, OF NEW YORK, N. Y., A CORPORATION OF NEW JERSEY

CUT OFF MECHANISM FOR METERS

Application filed June 14, 1929. Serial No. 370,834.

This invention relates to cut-off mechanism for meter valves whereby the valve may automatically be closed when a predetermined quantity of liquid has passed through the meter. In accordance with the invention there is included in the mechanism a register and dial, the register being capable of being preset with respect to the dial so that the operator may determine in advance the amount of fluid which is to flow through the meter. This mechanism is operated by the meter through gearing driven from the meter shaft. Mechanism is provided for bringing about the operation of the valve to stop the flow of fluid through the meter when a predetermined quantity has passed therethrough.

A further object of the present invention is to provide an arrangement of levers and actuating devices of such character that a minimum load is placed on the meter by the cut-off mechanism.

Still another object of the invention is to provide mechanism which will indicate the amount of fluid which actually has passed through the meter so that a check on the accuracy with which the operator has set the mechanism will be afforded, as well as a device for adjustments of the amount of fluid passing through the meter in subsequent operations.

The invention will now be described in more detail with reference to the following specific embodiment illustrated in the accompanying drawings, in which:

Figure 1 is a front view showing the meter and the registering devices.

Figure 2 is a side elevation of the mechanism, looking from right to left in Figure 1.

Figure 3 is a rear elevation of the apparatus, partly broken away to show the cam and roller mechanism for actuating the valve to cut-off the flow of fluid through the meter.

There is shown at $a$ a casing and at $a'$ a form of fluid meter. From the top of this meter there extends a shaft $b$, carrying a gear $b'$ which is caused to rotate by the action of the meter when fluid passes therethrough. This gear drives gear $b^2$ on shaft $b^3$, which shaft has fixed thereon gear $b^4$ for driving in turn gear $b^5$ on shaft $b^6$. The purpose of interposing gears $b^4$ and $b^5$ in this train of gears is to provide means for compensating for slight inaccuracies in the fluid meter by providing pairs of gears with varying numbers of teeth, and using that pair which will give the most nearly correct reading on the recording dials. Carried on the shaft $b^6$ is the gear $b^7$ which drives pinion $b^8$ on the drive shaft $b^9$. On this shaft is fixed a worm $c$ for driving the worm wheel $c'$ which operates the recording counters $c^2$. Also on the shaft $b^9$ is a worm $d$ in mesh with worm wheel $d'$ on shaft $d^2$, which carries the pinion $d^3$ for driving gear $d^4$ which is loosely mounted on shaft $d^5$. On this shaft $d^5$ is a pinion $d^6$ against which the gear $d^4$ is frictionally held by the spring $d^7$. The pinion $d^6$ drives a gear $d^8$ which is secured to the shaft $d^2$. On the shaft $d^2$ is a pointer $d^9$ which may be set with respect to the dial $d^{10}$ by means of a manually operated knob $d^{11}$. Near the other end of the shaft $d^2$ is a cam $e$ which actuates the cut-off mechanism upon predetermined rotation of the shaft $d^2$. This cam, as shown clearly in Figure 3, supports a rod $e'$ through a roller $e^2$ carried between the plates $e^3$ which are pivoted at $e^4$ to a stationary part of the device. On the shaft $d^2$ is a pinion $e^5$ always in mesh with a gear $e^6$ having an arm $e^7$ attached thereto and carrying the weight $e^8$ to prevent any back-lash in the operation of the device. The upward movement of the rod $e'$, caused by the rotation of the cam, moves the tripper $f$ about its pivot $f'$ to release the lever $f^2$, pivoted at $f^3$, to permit the arm $f^4$ to swing upwardly under the actions of the spring actuated plunger $g$ and the spring $g'$ tending to close the valve $g^2$. Hand lever $g^3$ is pivoted to the stationary arm $g^4$ at $g^5$ and cooperates with the arm $f^4$ to which it is pivoted to open the valve and set the tripper mechanism. In order to manually trip the lever $f^2$, if it is desired to shut off the flow of fluid before the predetermined amount has passed through the meter, a hand lever $h$ is provided. This acts against an arm $f^5$ of the tripper $f$ and is returned to normal by a spring $f^6$.

The shaft $b^9$ carries a worm $i$ for driving a worm wheel $i'$ frictionally attached to the shaft $i^2$ which has a pinion $i^3$ secured thereto. The pinion $i^3$ drives a gear $i^4$ on the shaft $i^5$, said shaft also carrying a pinion $i^6$ for driving gear $i^7$ secured to the sleeve $i^8$ on which is mounted hand $i^9$. On the shaft $i^2$ is secured a hand $i^{10}$, the two hands indicating the flow of fluid in tens, units and hundreds. A knob $j$ is secured to the shaft $i^2$ for setting the hands as desired.

It will be understood that in setting the mechanism for operation the hand lever $g^3$ is pulled to the left in Figure 1, thereby forcing open the valve $g^2$ against the action of the spring $g^1$. The hand lever is held in this position, with the valve open, through the co-operation of the arm $f^4$, the lever $f^2$, and the tripper $f$. The parts will remain in this position until the tripper $f$ is moved upward by the rod $e^1$ actuated by the cam $e$. The time when this action takes place is determined by the setting of the cam $e$ through the medium of its shaft $d^2$ and the operating knob $d^{11}$. Through the knob $j$, on the shaft $i^8$, the hands $i^9$ and $i^{10}$ may be set by the operator, to be driven thereafter from the vertical shaft $b^9$ through the described mechanism.

The arm $f^4$ is shown provided with a shutter $k$ interposed between incandescent lamp $k'$ and a hole (not shown) in the casing through which the lamp can be seen. When the valve is open the light shows, and when the valve is closed the light is cut-off, thus giving a visual indication as to the operation of the device.

It will be appreciated that in the operation of the device, should the operator wrongly estimate the desired amount of fluid he may on a subsequent run provide for either more or less fluid flow by coordinating the two indicators, so that the resulting total flow will be the exact quantity desired, the upper indicator showing the amount which has actually passed through the meter and the lower indicator the added amount desired.

Although the invention has been described with reference to the specific embodiment illustrated, it will be understood that applicant is not to be limited save by the scope of the appended claims.

What I claim is:

1. In combination with a meter a valve operable to stop the flow of fluid through the meter and means continually tending to close the valve, locking means to maintain the valve in open position and to permit it to close upon predetermined flow of fluid through the meter comprising a member adapted to push the valve, an arm operatively engaging the member, a second arm pivoted to the first arm, detent mechanism to lock the second arm against movement, a cam operated by the meter, and connections between the cam and the detent mechanism for releasing the latter whereby the valve may close.

2. In combination with a meter, a valve operable to stop the flow of fluid through the meter and means continually tending to close the valve, locking means to maintain the valve in open position and permit it to close upon predetermined flow of fluid through the meter comprising a lever adapted to push the valve, an arm operatively engaging the lever, a second arm pivoted to the first arm, detent mechanism to lock the second arm against movement, a cam operated by the meter, and connections between the cam and the detent mechanism for releasing the latter whereby the valve may close.

3. In combination with a meter, a valve operable to stop the flow of fluid through the meter and means continually tending to close the valve, locking means to maintain the valve in open position and to permit it to close upon predetermined flow of fluid through the meter comprising a lever adapted to push the valve, an arm pivoted to the lever, a second arm pivoted to the first arm, detent mechanism to lock the second arm against movement, a cam operated by the meter, and connections between the cam and the detent mechanism for releasing the latter whereby the valve may close.

4. The combination as claimed in claim 1, wherein the connections between the cam and the detent mechanism comprise a roller to rest on the cam, a rod to push the detent mechanism, and means pivoted to a stationary part of the device to connect the roller to the rod.

This specification signed this 31st day of May A. D. 1929.

WILLIAM L. MARDEN.